United States Patent [19]

Jen et al.

[11] Patent Number: 4,589,037

[45] Date of Patent: May 13, 1986

[54] SERVO CONTROL SYSTEM USING A VARYING FREQUENCY SERVO PATTERN FOR READ/WRITE HEAD POSITIONING IN A MAGNETIC RECORDING DISK FILE

[75] Inventors: Shen Jen, Richardson, Tex.; William J. Kabelac, Morgan Hill; Ian L. Sanders, San Jose, both of Calif.

[73] Assignee: International Business Machines Corporation, Armonk, N.Y.

[21] Appl. No.: 713,139

[22] Filed: Mar. 18, 1985

[51] Int. Cl.$^4$ .............................. G11B 5/55; G11B 5/56
[52] U.S. Cl. ........................................ 360/77; 360/78
[58] Field of Search ................................... 360/77, 78

[56] References Cited

U.S. PATENT DOCUMENTS

| | | | |
|---|---|---|---|
| 3,812,533 | 5/1974 | Kimura et al. | 360/77 |
| 4,135,217 | 1/1979 | Jacques et al. | 360/77 |
| 4,188,646 | 2/1980 | Sordello et al. | 360/77 |
| 4,346,413 | 8/1982 | Hack | 360/77 |
| 4,348,703 | 9/1982 | Janosi | 360/77 |
| 4,396,959 | 8/1983 | Harrison et al. | 360/77 |
| 4,488,187 | 12/1984 | Alaimo | 360/77 |

OTHER PUBLICATIONS

IBM Journal of Research and Development, Nov. 1974, "Design of a Disk File Head-Positioning Servo", pp. 506–512, R. K. Oswald.

Primary Examiner—George G. Stellar
Attorney, Agent, or Firm—Thomas R. Berthold

[57] ABSTRACT

An improved magnetic recording disk drive, in particular a flexible disk drive, includes a head positioning servo system which utilizes servo information recorded on the disk by the disk drive. The servo information is located within one of the data sectors and is in the form of a pattern of radially spaced-apart segments, each segment overlapping a number of data tracks and comprising magnetic transitions which increase in frequency in the radial direction to provide a digital head position error signal (PES). A similar segment is located in each of the other data sectors around the perimeter of the disk to provide track profile information so that the head positioning system can compensate for disk runout and distortion. The disk drive includes means for eliminating the effect of the amplitude of the readback signal from the servo and profile segments on the head positioning system, thus assuring a reliable PES at all radial locations on the disk and allowing interchangeability of disks among disk drives.

11 Claims, 8 Drawing Figures

SERVO CONTROL SYSTEM USING A VARYING FREQUENCY SERVO PATTERN FOR READ/WRITE HEAD POSITIONING IN A MAGNETIC RECORDING DISK FILE

TECHNICAL FIELD

This invention relates to magnetic recording disk files (or "drives") of the type having a servo control system for the centering of the read/write head over the data tracks, and in particular to a flexible disk drive which is capable of writing track centering servo information on the flexible disk and reading that information to correctly position the read/write head.

BACKGROUND OF THE INVENTION

Conventional flexible disk drives which operate with flexible disks having relatively low track density, e.g. 48 to 135 tracks per inch (tpi), typically do not have a control system to position the read/write head over the data tracks or to maintain it over the centerline of the data tracks during read or write operations. Rather, such disk drives operate "open loop" by use of a head positioning motor, such as a calibrated stepper motor, to correctly position the head over the data tracks. In order to substantially increase the track density in flexible disk drives, it is necessary to incorporate a servo control system to center and maintain the head over the tracks during read or write operations. While the need for a servo control system exists in any disk file with a relatively high track density, it is especially critical in the case of flexible disks because such disks are subject to nonuniform distortion due to temperature and humidity changes, spindle motor runout and other effects.

One well known method of incorporating servo information in a rigid disk drive is to use pre-recorded servo signals on equally angularly spaced sectors which extend out radially from the disk center. As the rigid disk rotates, the head receives sampled track position signals as the servo sectors pass beneath the head. This technique, or similar techniques which utilize prerecorded servo signals, is not suitable for use with flexible disk drives because flexible disks are generally available in unrecorded form and any recording of servo information in angularly spaced sectors would significantly increase the cost of the disks. Furthermore, the time required to record servo information in multiple sectors on each track would be prohibitive if recorded by the user's disk drive.

There are several conventional techniques for generating a track position error signal (PES) from the servo information within the servo sectors in rigid disk drives. In one technique, as disclosed in U.S. Pat. No. 3,812,533 to Kimura, et al., the servo signals for the data tracks are angularly staggered so that the time between a reference pulse and the servo signal for the particular track identifies that track within a group of tracks. In a second technique, as described in an article by R. K. Oswald entitled "Design of a Disk File Head-Positioning Servo" in the *IBM Journal of Research and Development*, November, 1974, pp 506-512, the PES is generated by comparing the amplitudes of the signals from servo blocks spaced on opposite sides of the track centerlines.

In addition to the incompatibility of servo sectors with flexible disk drives, neither of the rigid disk drive PES generating techniques is suitable for use with flexible disk drives because of the complex, relatively costly timing or analog amplitude detection circuitry required.

U.S. Pat. No. 4,188,646 to Sordello, et al. discloses a sector servo pattern for a recording disk in which adjacent servo tracks abut the centerline of the data track, the servo information in each servo track comprising a specific, unique frequency. The head senses the different frequencies from adjacent servo tracks and combines them with modulation frequencies from a phase locked oscillator. The resulting combined signal is used to correct the head position to locate it over the track centerline.

U.S. Pat. No. 4,346,413 to Hack discloses a servo control system for a flexible disk drive in which the servo information is a constant frequency slanted pattern within the data track, the slant having been formed by the erasure of a portion of the servo signal. The slanted erased portion thus creates a servo pattern of constant frequency in the radial direction. The amount of servo signal read by the head is a function of radial position.

U.S. Pat. No. 4,348,703 to Janosi discloses a servo system for a flexible disk drive and includes means for writing servo information on the flexible disk. The servo information is similar to that in the U.S. Pat. No. 4,188,646 in that it includes a specific frequency for each data track and means for combining the frequency patterns of adjacent servo tracks to position the head. The servo information is written in only one of the sectors of the flexible disk, the remaining sectors being dedicated to data.

U.S. Pat. No. 4,135,217 to Jacques, et al. discloses a disk drive which utilizes stored disk distortion or runout information to provide track profile information and U.S. Pat. No. 4,396,959 to Harrison, et al. discloses, at column 9, lines 31-53, a calibration technique for generating track profile information.

SUMMARY OF THE INVENTION

The present invention is an improved flexible disk drive capable of writing servo information of a constantly varying frequency format on the flexible disk and reading that information to center and maintain the head within the selected tracks. Blank flexible disks are formatted by the user into equally angularly spaced data sectors. In the present invention the pattern of servo information is written in one of those data sectors in the form of a group of radially spaced segments of increasing frequency, each segment overlapping a predetermined number of tracks. The PES is generated digitally because the head reads magnetic transitions within the servo segment, the number of transitions directly corresponding to the radial position of the head within the segment.

The flexible disk drive also includes means for writing similar segments near the outer perimeter of the disk outside of the data storage area and at angular positions corresponding to each of the data sectors. This information is used to generate a profile of the data tracks so that the head position can be adjusted to compensate for disk distortion.

The flexible disk drive of the present invention includes simple and cost effective means to write and read servo information, allows digital sensing of servo signals, and achieves good head positional resolution and accuracy, thereby permitting increased track density. In addition, the drive can read previously recorded low track density disks which do not have servo information by suitable software instructions which inhibit the drive from searching for servo information.

For a fuller understanding of the nature and advantages of the present invention, reference should be made to the following detailed description taken in conjunction with the accompanying drawings.

DESCRIPTION OF THE PREFERRED EMBODIMENTS

Figure 1:
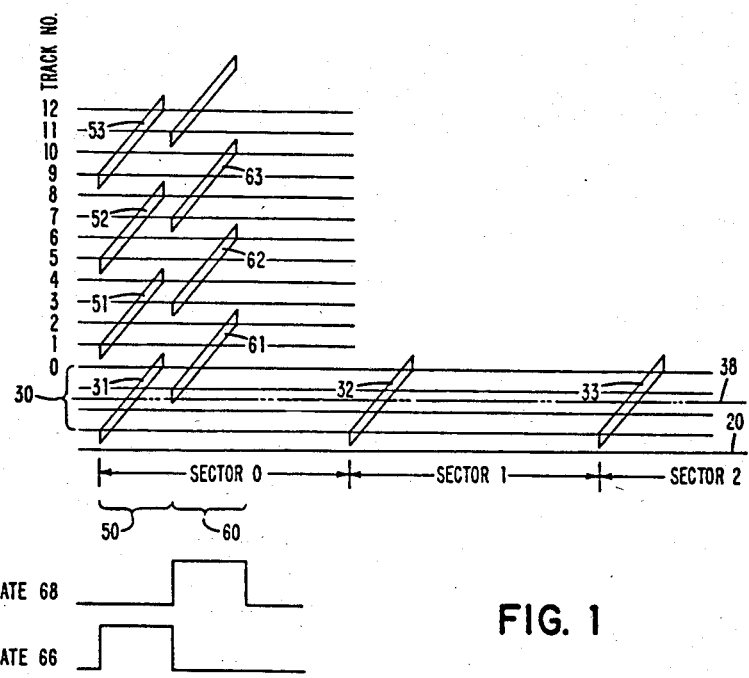
FIG. 1 is an illustration of the pattern of servo and profile segments on a portion of the disk.

Referring first to FIG. 1, the pattern of servo information utilized in the disk drive of the present invention is illustrated on a portion of a data disk in which, for convenience in explanation, portions of the concentric circular data tracks are represented as straight lines. The portion of the disk shown in FIG. 1 has an outside diameter 20, a non-data region 30 near the outside diameter, and a plurality of data tracks, represented by data track centerlines 0 through 12. The last data track (not shown) is located close to the inside diameter of the disk. The disk is divided into angularly spaced data sectors, beginning with sector 0. In the case of flexible disks, there are typically 8 or 9 data sectors which are formatted on the blank disk by the disk drive before the disk is used.

The single sector servo information recorded on the disk shown in FIG. 1 is identified as representative segments 51, 52, and 53 which are located within a band 50, and representative segments 61, 62, and 63 which are located within an adjacent angularly spaced band 60. Band 50 occurs within a specific time gate 66 and band 60 occurs within a subsequent time gate 68. The segments 31, 32, and 33 within the non-data region 30 are not part of the sector servo information in bands 50 and 60, but are used for generating track profiles for adjusting the position of the head, in the manner to be explained later. Each of the segments of servo information in this example spans the centerlines of two adjacent tracks. For example, segment 51 in band 50 provides servo information for positioning the head at the centerline of either track 2 or 3, and segment 62 in adjacent band 60 provides information to center the head over either of tracks 4 or 5. In the example of FIG. 1, the open-loop tolerance of the head positioning means, which may be a finely calibrated stepper motor, is at least plus or minus one-half track. Thus if the head were commanded to move to track 2 the stepper motor has sufficient accuracy to position the head within one-half track of the track 2 centerline.

Figure 2:
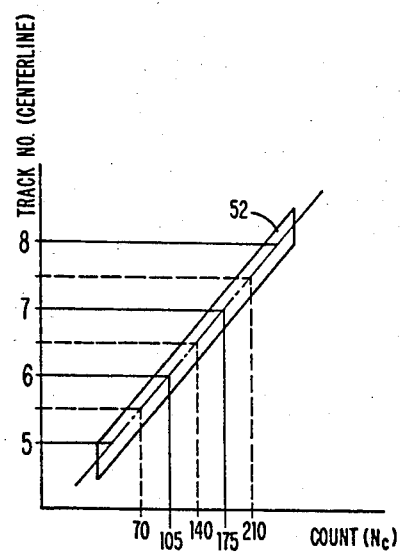
FIG. 2 is a calibration of the count of magnetic transitions within a servo segment as a function of radial position.

The information contained in each of the servo segments shown in FIG. 1 consists of magnetic transitions which increase linearly in frequency with radial position along the segment. The calibration of radial position along the segment as a function of the number of magnetic transitions sensed by the head is shown in FIG. 2 and the circuitry in the disk drive to write the servo segments is depicted in block diagram form in FIG. 3.

Figure 3:
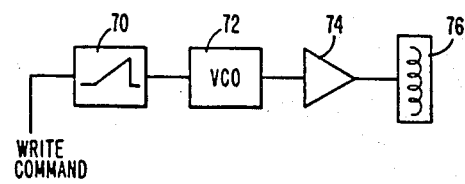
FIG. 3 is a block diagram of the means for writing the servo and profile segments on the disk.

Referring to FIG. 3, the method of writing a typical servo segment, such as segment 52 in FIG. 2, will be explained. When the disk is rotating at its operating speed a write command from a microprocessor (not shown) in the disk drive triggers a ramp generator 70 to control a voltage controlled oscillator (VCO) 72. The VCO 72 then delivers to amplifier 74 connected to read/write head 76 a signal in the form of voltage pulses which linearly increase in frequency according to the linear profile of ramp generator 70. Simultaneous with commencement of this frequency profile to head 76, the microprocessor commands the stepper motor (not shown) to move the head 76 in a radially inward direction with a constant velocity when the beginning of data sector 0 (FIG. 1) is underneath head 76. This occurs during time gate 66 (FIG. 1). The head 76 thus writes the servo segment 52 on the disk. The beginning and ending frequencies of the signal from VCO 72 determine the minimum and maximum number of magnetic transitions, respectively, within the segment 52. In this example the VCO 72 generated a frequency profile which produced a linear range of magnetic transition count within the segment of 70 to 210 (FIG. 2). If the disk had a track density of 270 tpi, this would correspond to a track width of approximately 3.7 mils (0.0037 inches) and a slope of the calibration curve of approximately 18.9 magnetic transitions per mil (or 70 per track).

With each pass of sector 0 under the head 76 a new servo segment in band 50 is written in this manner. When all of the servo segments in band 50 are written on the disk, the servo segments in band 60 are written in a similar manner, the difference being that the frequency profile from VCO 72 and the constant-velocity movement of head 76 occur during time gate 68. Since the servo segments are written on the disk by the disk drive, the frequency range of the signal from VCO 72 is selected to be between the 1 F and 2 F operating frequencies of the disk drive. For a flexible disk drive, a typical 1 F frequency corresponding to an "all zeros" data pattern is 125 kHz and a typical 2 F frequency corresponding to an "all ones" data pattern is 250 kHz. Also, it should be apparent that while the frequency profile from VCO 72 is linear in this embodiment, any monotonically increasing profile would also function to create the servo segments according to this invention.

While in this embodiment only one servo segment is written per revolution of the disk, it should be apparent that if time gates 66 and 68 are separated by a delay, two servo segments, e.g. segments 51 and 62, could be written in one pass of data sector 0 beneath head 76. In addition, the servo segments could be divided into more than two bands within data sector 0.

Referring again to FIG. 1, the non-data region 30 contains segments of servo information at the beginning of each data sector, such as segments 31, 32, and 33 at the beginning of sectors 0, 1, and 2 respectively. These segments, referred to as disk "profile" segments contain linearly increasing frequency information identical to that contained in the servo segments. The profile segments are used to generate an approximation of the profile of the various tracks to provide an adjustment to head position so that the head accurately follows the data tracks. This profile information is especially critical in the case of flexible disks which are subject to becoming out of round due to temperature and humidity changes and other factors, such as spindle motor runout. For this reason, the count corresponding to a particular track, for example the count in servo segment 52 corresponding to track 6 (FIG. 1), would only be precisely accurate in sector 0 where the servo segment 52 is located. The rotation of the disk beneath the head would not result in the head precisely following track 6 unless the disk were perfectly circular. If it is desired to read or write data in a different sector on track 6, it may be necessary to provide an adjustment to the position of the head because of the non-circular profile of the disk.

Figure 4:
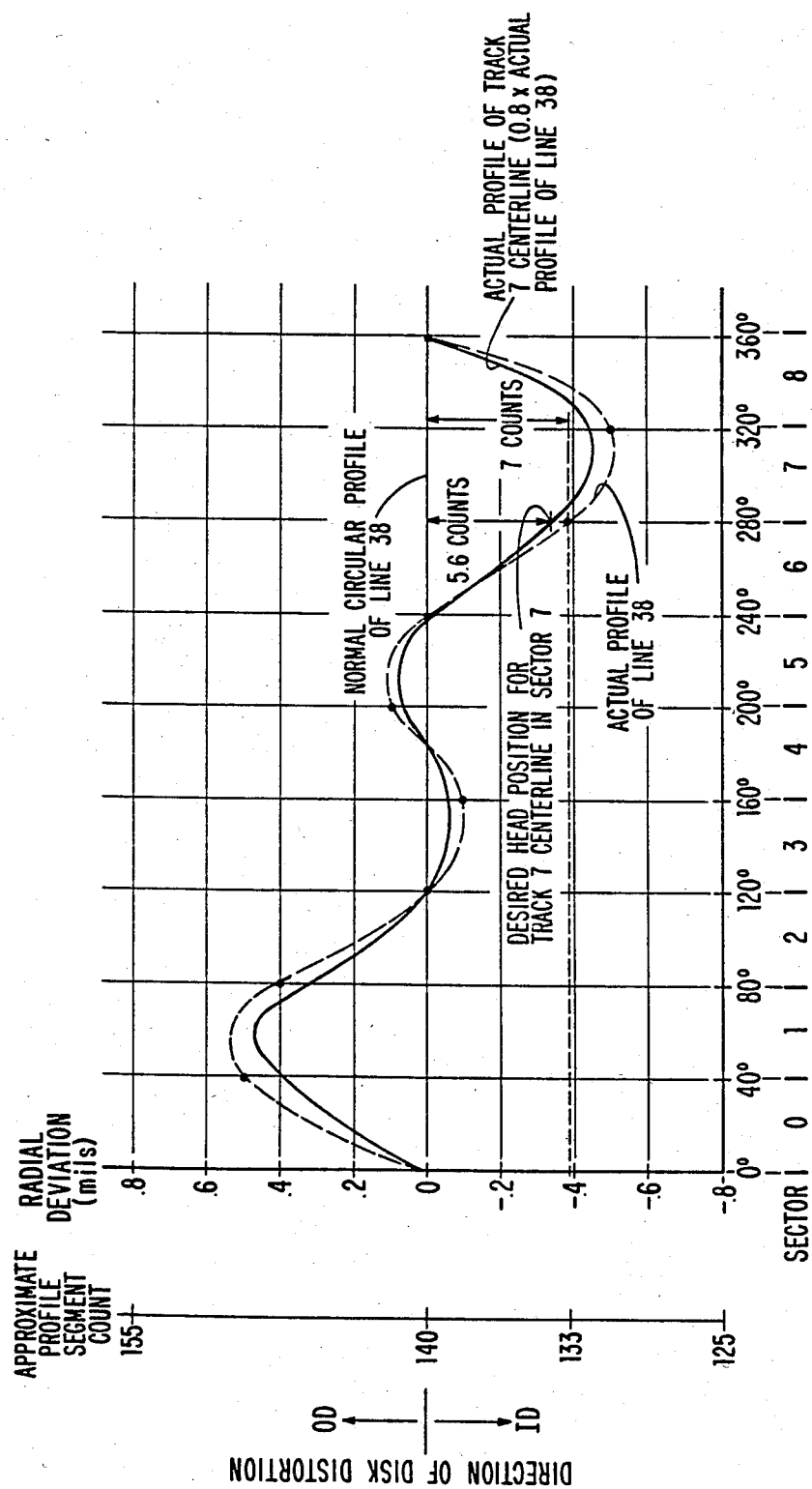
FIG. 4 is an illustration of a typical track profile caused by disk runout.

A typical profile for the outside diameter of a flexible disk is illustrated in FIG. 4. The nominal maximum radial extension of the head is indicated by line 38 (FIGS. 1 and 4) which corresponds to a count of 140 within the profile segment 31 in sector 0. This value can be determined from the calibration curve of servo segment 52 in FIG. 2, since all profile and servo segments have the same calibration. If the head were located at this radial position and the disk were perfectly circular, then the count in the profile segments within each of the sectors would be identical, namely 140. However, the actual values read by the head as the profile segments for the respective data sectors pass under the head is shown in FIG. 4, where the dotted line indicates the approximate profile of line 38 of the disk.

The pattern of servo segments and profile segments can be better understood by considering their utilization during operation of the disk drive. For purposes of this example, it will be assumed that the disk drive is initially turned off, the disk has been formatted into 9 sectors including the one servo sector and the single sector servo segments and profile segments have been written on the disk in the pattern shown in FIG. 1. After the disk drive is first turned on, the head is driven to the nominal radially outermost position, as indicated by line 38. As the disk rotates beneath the head, the head reads magnetic transitions in each of the profile segments in the non-data region 30 for each of the sectors, beginning with sector 0 and ending with sector 8 (not shown). These 9 count values are then stored in a suitable memory device, such as a random access memory (RAM), accessible by the microprocessor.

It will be assumed that it is now desired to write data in track 7 of sector 7. Track 7 is located within the area covered by servo segment 52. The microprocessor then commands the stepper motor (not shown) to move the predetermined number of steps to drive the head to the approximate location of track 7 centerline. This value of the number of steps is determined from previously recorded values within a memory storage device, for example a read only memory (ROM), as determined from the calibration of the stepper motor. After the head arrives at the approximate track 7 location it reads the number of magnetic transitions during the time gate 66 corresponding to the band 50 passing under the head. The count value read would be within the range of 140 to 210, as shown from the calibration curve of FIG. 2, since the tolerance of the stepper motor is assumed to be plus or minus one-half track. The actual value read is then compared with the desired value, the desired value being a count of 175 which corresponds to the centerline of track 7, to arrive at a PES. The PES is then used to command the stepper motor to drive the head the proper number of steps and in the proper direction to arrive at the desired destination, i.e. the centerline of track 7. Typically this occurs within one pass of sector 0 beneath the head so that on the second pass the head is located over the centerline of track 7 in sector 0.

While it should be apparent that the above technique has resulted in the head being correctly aligned with the centerline of track 7 on sector 0, it is known from the disk profile data, as shown in FIG. 4, that if the head is maintained in this fixed radial position when over sector 7, the sector where data is to be written in this example, it will be misaligned with the centerline of track 7. It is thus necessary to apply an adjustment to move the head slightly so that when it is over sector 7 it is following the centerline of track 7. In this example, if track 7 is located at a radius equal to 0.8 times the radius of one 38, then an approximate value of the adjustment can be determined as 0.8 times the offset at line 38, as determined from FIG. 4. This is represented by the solid line in FIG. 4, which is an estimate of the actual profile of the track 7 centerline. At the beginning of sector 7, the head aligned with line 38 would read a count of approximately 133 from the profile segment in sector 7, thus indicating that the disk at that angular position is distorted radially inward a distance corresponding to a count of 7 (the true position 140 less the actual position 133). This in order for the head to be approximately located over the centerline of track 7 in sector 7, it must by moved radially inwardly a distance corresponding to $0.8 \times 7 = 5.6$ counts (or approximately 6 counts) from the centerline of track 7 in sector 0. In actuality, the above computation occurs for each sector during the rotation of the disk so that the head essentially follows a profile similar to that indicated by the line representing the track 7 centerline in FIG. 4. Of course the amount of correction to be applied must be compensated by interpolation for the particular radial location of the desired track relative to line 38.

The above-described servo and profile segments and the technique for their recording have been explained for a disk drive having a single read/write head which both writes and reads the servo information. It is of course possible to utilize the servo system of this invention with disks in which the servo and profile segments have not been written by the disk drive but are prerecorded. In addition, the servo system of this invention is fully applicable to a disk drive having two heads, a wide head for writing both data and the servo information and a narrower head for reading both data and the servo information.

The present invention also includes two techniques for removing the dependence of the magnetic transitions counted from the value of the readback signal amplitude, which thereby permits the interchangeability of disks recorded with the above-described servo segments.

The number of magnetic transitions counted by the head during one passage of a servo segment, as shown in the calibration curve of FIG. 2, is given by the expression $$N_c = (1 - \alpha/\beta)N_a,$$

where
- $N_c$ is the number of magnetic transitions counted,
- $N_a$ is the actual number of magnetic transitions in that portion of the servo segment which passes under the head,
- $\alpha$ is the threshold for the readback signal, and
- $\beta$ is the amplitude of the readback signal.

Figure 5A:
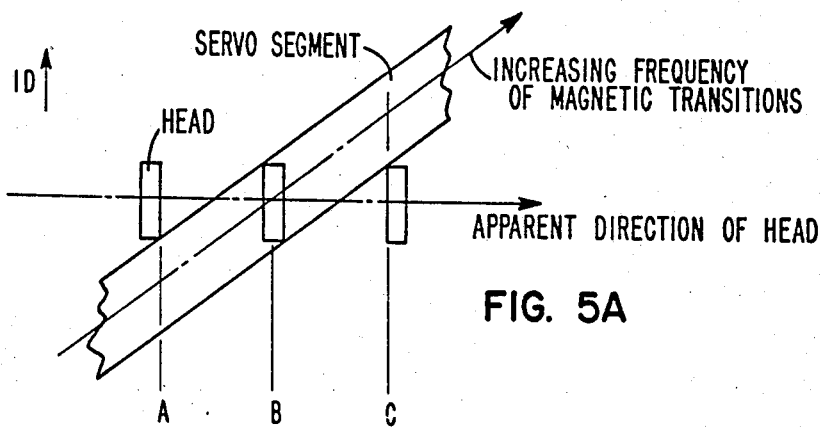
FIG. 5A is an illustration of the path of a servo segment beneath the read/write head.
Figure 5B:
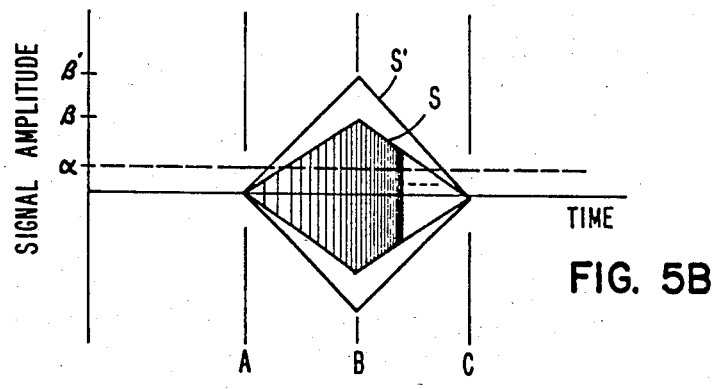
FIG. 5B is an illustration of the readback signal from the head in FIG. 5A.

A representation of the signal read by the head during the passage of a portion of a servo segment is illustrated in FIGS. 5A and 5B. When the head is at point A on the servo segment, it is at the point of first contact with the magnetic transitions contained within the segment. No magnetic transitions have yet been sensed and there is no output signal (FIG. 5B).

During the apparent movement of the head from point A to point B, two things occur. First, because the servo segment is slanted relative to the apparent direction of the head, the head begins to read a greater portion of the signal. This is illustrated by the linearly increasing amplitude of the signal S from point A to point B, as shown in FIG. 5B. Secondly, the head has also experienced apparent movement along the direction of the servo segment in which the frequency of the magnetic transitions is increasing. Thus, the rate at which the magnetic transitions are sensed by the head is increasing. This is represented graphically in FIG. 5B by the increasing closeness of vertical lines within the signal envelope. When the head is at point B the entire head is receiving a signal from the servo segment and the maximum amplitude $\beta$ of the signal S is attained.

During the apparent movement of the head from point B to point C, the portion of the head reading the signal linearly decreases while the frequency of the magnetic transitions continues to increase.

The total signal S thus viewed by the head is represented in FIG. 5B during the passage of the servo segment from point A to point C. However, only those magnetic transitions having an amplitude above a certain threshold $\alpha$ form a part of the count $N_c$. The threshold $\alpha$ is required to eliminate noise read by the head. It should be apparent from the above relationship between $N_c$ and $N_a$, as well as from FIG. 5B, that if $\alpha$ were O, $N_c$ would equal $N_a$.

As is apparent from FIGS. 5A, 5B and the above relationship between $N_c$ and $N_a$, the count $N_c$ is a function of the readback signal amplitude $\beta$. The signal amplitude $\beta$ can vary from disk to disk, as a result of the particular parameters of the magnetic coating of the disk media and the particular disk drive which recorded the signal, as well as within a single disk, as a result of the variation in linear velocity of the media from the disk inside diameter to the outside diameter. A disk which generates a readback signal S' with an amplitude $\beta'$ is illustrated in FIG. 5B. In the case of this disk, the apparent movement of the head from point A to point C generates a count different from the count generated by the disk having readback signal S of amplitude $\beta$.

Figure 6:
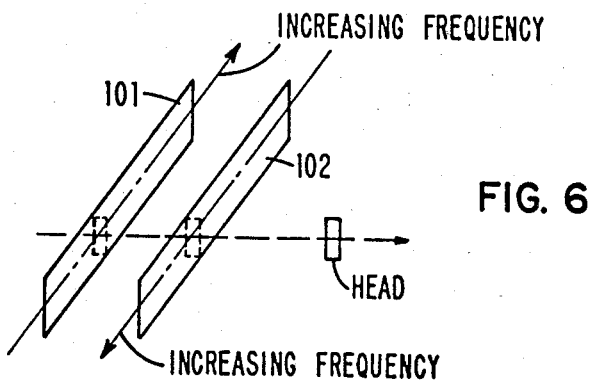
FIG. 6 is an illustration of an alternative servo pattern to eliminate the dependence of readback signal amplitude on the number of magnetic transitions counted.

One technique for removing the dependence of $N_c$ on the readback signal amplitude $\beta$ involves complementary adjacent servo segments in which the frequency of the magnetic transitions increases in opposite directions. This is illustrated in FIG. 6. In this technique, two count values, denoted $N_{c1}$ and $N_{c2}$ corresponding to magnetic transitions read in segments 101 and 102, are generated as the complementary servo segments pass beneath the head. From these two count values a new value $N_t$ can be computed according to the following relationship:

$$N_t = \frac{N_{c1} - N_{c2}}{N_{c1} + N_{c2}}.$$

It should be apparent by inspection that the term $(1-\alpha/\beta)$ is factored out of the above equation so that $N_t$ is not function of the readback amplitude $\beta$. A calibration curve of $N_t$ as a function of radial position along the complementary servo segments can be derived to provide a PES to control the movement of the head. The servo counts $N_{c1}$ and $N_{c2}$ are obtained in immediate succession as the servo segments pass under the head (FIG. 6). The computation of $N_t$ can be accomplished by suitable software under control of the microprocessor.

Figure 7:
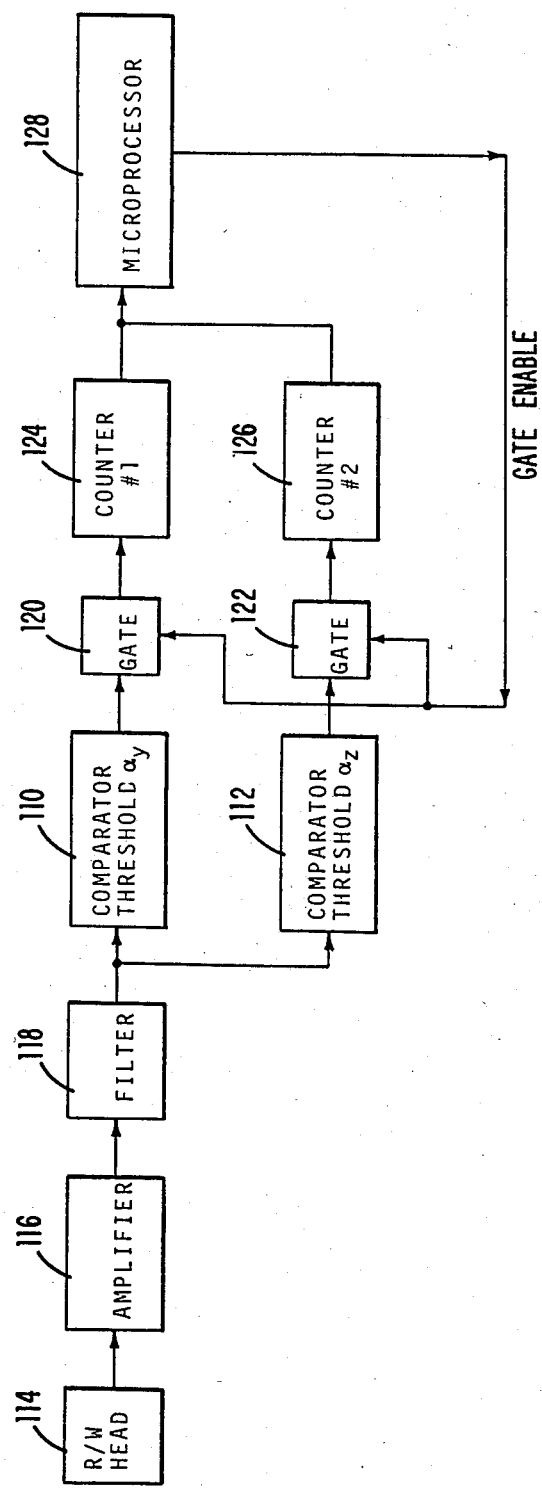
FIG. 7 is a block diagram of means usable with the servo pattern of FIG. 1 for eliminating the dependence of readback signal amplitude on the number of magnetic transitions counted.

A second technique for eliminating the dependence of the servo count upon the readback signal amplitude $\beta$ involves the servo pattern previously described and illustrated in FIG. 1 and the readback circuitry shown in block diagram form in FIG. 7. This technique utilizes two comparators 110 and 112 connected in parallel to the read/write head 114, an amplifier 116 and a filter 118 being located between head 114 and the comparators 110, 112. The comparators have trigger levels set to compare the signal to different threshold levels, namely $\alpha_y$ and $\alpha_z$, respectively. As the servo segment begins to pass under the head, a gate-enable pulse from the microprocessor 128 to gates 120, 122 transfers the digital signals arising from the sensed magnetic transitions to respective digital counters 124, 126. The two count values within counters 124, 126 are accessed by the microprocessor 128, and input into a suitable software routine to generate a combined value which is independent of the readback signal amplitude $\beta$.

One manner of combining the two count values from counters 120, 124 is to compute a new term as follows:

$$N_x = \frac{\alpha_y N_z - \alpha_z N_y}{\alpha_y - \alpha_z},$$

where
- $N_y$ is the count in counter 124, corresponding to the number of magnetic transitions above threshold $\alpha_y$,
- $N_z$ is the count in counter 126, corresponding to the number of magnetic transitions above threshold $\alpha_z$, and
- $N_x$ is the new computed value independent of $\beta$.

It can be shown that by this combination of the count values $N_y$ and $N_z$, the computed value $N_x$ is independent of the readback signal amplitude $\beta$.

Thus either of the two above-described techniques provides for the interchangeability of disks which have been recorded with servo segments and profile segments having magnetic transitions which increase in frequency in a radial direction. In addition, these techniques compensate for the variation of readback signal amplitude within a particular disk.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. In a magnetic recording disk file having a disk with multiple concentric data tracks, a read and write head, and means attached to the head for moving the head near a selected track prior to the reading or writing of data, an improvement to the disk file comprising:

a group of radially spaced segments of servo information recorded on the disk, each segment extending radially over at least one track and comprising magnetic transitions which increase in frequency in a radial direction, whereby the number of magnetic transitions read by the head corresponds to a radial location along the segment; and means electrically coupled between the head and the head moving means for commanding the head moving means to position the head to the centerline of the selected track in response to the number of transitions read by the head in the segment of servo information.

2. The improved disk file according to claim 1 wherein alternate segments of servo information are located within a first radial band and the remaining segments are located within a second radial band angularly spaced from the first radial band, and wherein the means for commanding the head moving means further comprises means for generating a time gate corresponding to each of the radial bands and means for selecting the proper time gate corresponding to the band containing the servo segment for the selected track.

3. The improved disk file according to claim 1 further comprising means for recording the segments of servo information on the disk.

4. The improved disk file according to claim 1 further comprising like segments angularly spaced near the outer perimeter of the disk generally beyond the data tracks and means responsive to the number of transitions read in each of said outer perimeter segments and electrically coupled to the commanding means for adjusting the radial position of the head so as to follow the profile of the selected track.

5. The improved disk file according to claim 1 further comprising a second group of radially spaced segments of servo information angularly spaced from said first group, each segment in the second group extending radially over at least one track and comprising magnetic transitions which increase in frequency in a radial direction opposite to the direction of increasing frequency of the segments in the first group, the angularly adjacent segments in the first and second groups thereby forming pairs of segments of servo information which extend over the same tracks.

6. The improved disk file according to claim 5 wherein the means for commanding the head moving means includes means for combining the number of transitions read by the head in each segment within a pair to provide a value independent of the amplitude of the signal generated by the magnetic transitions.

7. In a magnetic recording flexible disk drive of the type utilizing a flexible diskette with multiple concentric tracks divided into a plurality of angularly spaced data sectors, a read and write head, and means attached to the head for moving the head near a selected track prior to the reading or writing of data, an improvement to the flexible disk drive comprising:

a group of radially spaced segments of servo information recorded on one of the sectors of the disk, each segment extending radially over at least one track and comprising magnetic transitions which increase in frequency in a radial direction;

means coupled to the head for writing the segments of servo information in one of the data sectors on the disk, said writing means including means for providing to the head a write signal which increases in frequency as the head moves radially;

means for processing the servo information contained within the segments, said processing means including means for generating a time gate generally corresponding to the angular width occupied by the group of servo segments, during which time gate the head reads magnetic transitions within the servo segment; and means responsive to the processing means for commanding the head moving means to position the head over a selected track.

8. The improved flexible disk drive according to claim 7 further comprising like segments of magnetic transitions located within each of the data sectors near the outer perimeter of the flexible disk generally beyond the data tracks, means for storing a count corresponding to the number of transitions read in each of said outer perimeter segments within each of the data sectors to thereby generate a stored profile of the outer perimeter of the disk, and means for computing a profile for each of the data tracks from the stored profile of the outer perimeter, said commanding means being responsive to the computed profile of the data tracks to adjust the position of the head so as to follow the profile of a selected data track.

9. The improved flexible disk drive according to claim 7 further comprising a second group of radially spaced segments of servo information recorded in the same sector as the first group and angularly spaced therefrom, each segment in the second group extending radially over at least one track and comprising magnetic transitions which increase in frequency in a radial direction opposite to the direction of increasing frequency of the segments in the first group, the angularly adjacent segments in the first and second groups thereby forming pairs of segments of servo information which extend over the same track, and means coupled to the head moving means for combining the number of transitions read by the head in each segment within a pair to provide a value independent of the amplitude of the signal generated by the magnetic transitions in the segments within the pair.

10. The improved flexible disk drive according to claim 7 wherein the servo information processing means further comprises means for counting only those magnetic transitions having a signal amplitude greater than a first threshold, means for counting only those magnetic transitions having a signal amplitude greater than a second threshold, and means for combining the two count values to provide a value independent of the amplitude of the signal generated by the magnetic transitions.

11. An improved flexible disk for magnetic recording wherein the improvement comprises a group of radially spaced segments of servo information recorded on the flexible disk, each segment extending radially over at least one track and comprising magnetic transitions which increase in frequency in a radial direction, whereby the number of magnetic transitions at any one radial location within a segment provides a unique indication of radial position within the segment.

* * * * *